United States Patent [19]

Becker

[11] 3,988,562

[45] Oct. 26, 1976

[54] ELECTRICAL RESISTANCE WELDING OF COATED SHEET METALS

[76] Inventor: Otto Alfred Becker, Robert Koch Strasse 59, 66 Saarbruecken 6, Germany

[22] Filed: Mar. 22, 1974

[21] Appl. No.: 453,780

Related U.S. Application Data

[60] Division of Ser. No. 208,963, Dec. 16, 1971, Pat. No. 3,805,013, which is a continuation-in-part of Ser. No. 869,668, Oct. 27, 1969, Pat. No. 3,629,544.

[30] Foreign Application Priority Data

| | | |
|---|---|---|
| Oct. 26, 1968 | Germany | 1805361 |
| Nov. 7, 1968 | Germany | 1807382 |
| May 31, 1969 | Germany | 1927915 |
| Sept. 3, 1969 | Germany | 1944614 |
| Sept. 20, 1969 | Germany | 1947771 |

[52] U.S. Cl. ................................ 219/93; 219/92
[51] Int. Cl.² ........................................ B23K 11/10
[58] Field of Search ............... 219/91, 92, 93, 94; 90/11, 14; 29/103; 480/72, 241

[56] References Cited
UNITED STATES PATENTS

| | | | |
|---|---|---|---|
| 1,294,679 | 2/1919 | Lachman | 219/94 |
| 2,253,375 | 8/1941 | Henninger | 219/91 |
| 2,404,149 | 7/1946 | Trinkle | 90/14 |
| 2,747,154 | 5/1956 | Abrams | 77/55 X |
| 3,067,488 | 12/1962 | Bennett et al. | 219/92 |
| 3,555,964 | 1/1971 | Fleming | 219/92 UX |
| 3,614,375 | 10/1971 | Becker | 219/92 |

Primary Examiner—Bruce A. Reynolds
Attorney, Agent, or Firm—Erich M. H. Radde

[57] ABSTRACT

The invention provides a method for the electrical resistance welding of coated sheet metals, in which welding current is fed to at least one of the coated sheets indirectly through the metal layer thereof and contact is established between blanc areas thereof to be welded to each other, wherein annular or elongated knife edges are provided at the welding area of the sheet metal to be welded on or on intermediate welding pieces, and cavities are produced by embossing and/or by milling, for preserving an outer coating undamaged by the heat of welding.

4 Claims, 29 Drawing Figures

U.S. Patent Oct. 26, 1976 Sheet 1 of 3 3,988,562
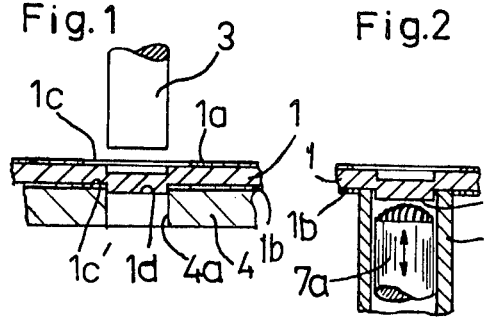
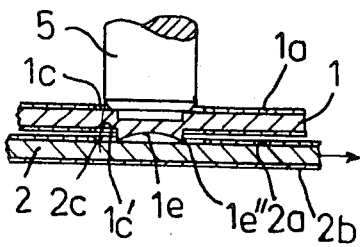
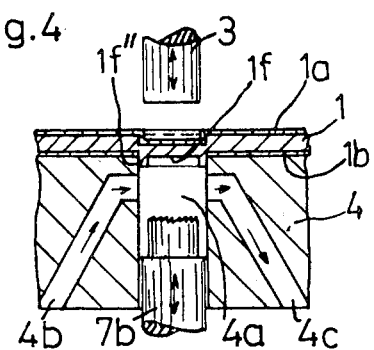
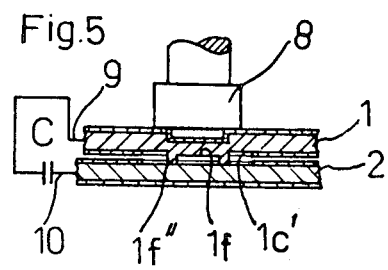
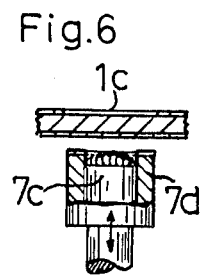
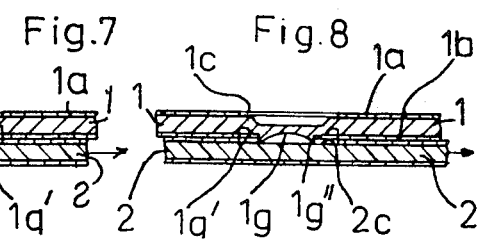
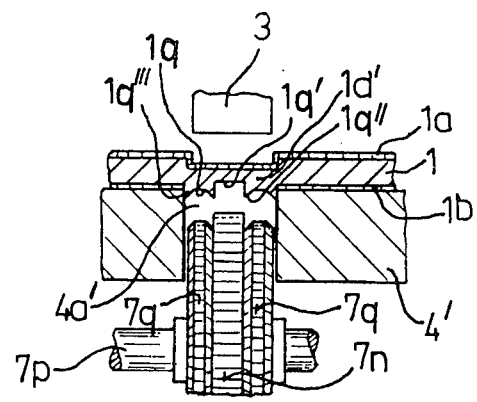

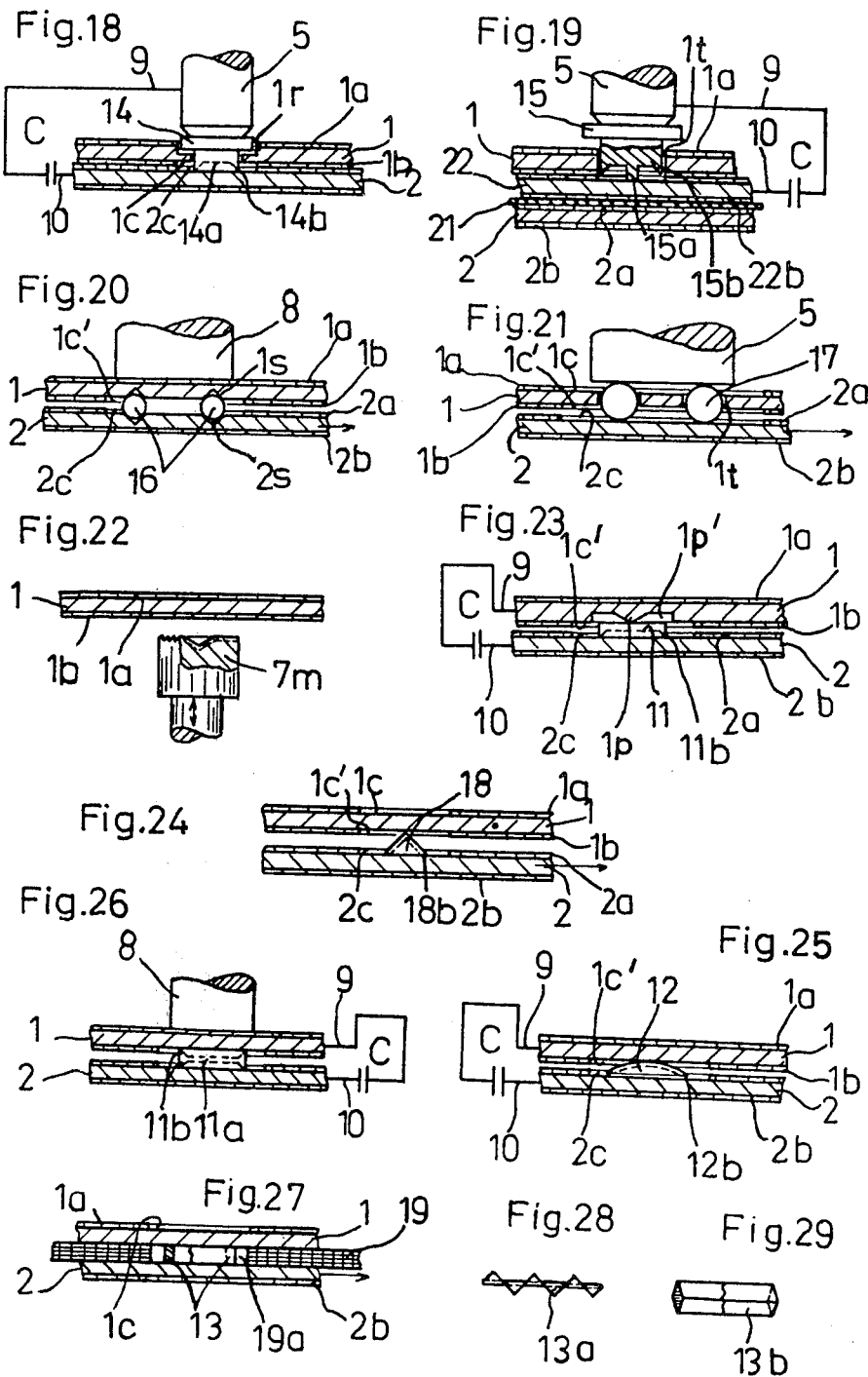

ELECTRICAL RESISTANCE WELDING OF COATED SHEET METALS

This is a divisional application of Ser. No. 208,963 filed Dec. 16, 1971, now U.S. Pat. No. 3,805,013, which is in turn a divisional application of Ser. No. 869,668, filed Oct. 27, 1969, now U.S. Pat. No. 3,629,544.

BACKGROUND TO THE INVENTION

Sheets coated with plastics are very desirable owing to the protection from rusting which the plastics coating gives, and also due to the fact that the plastics coating enables the sheets to be given any desired colour or surface pattern. Sheets of this kind cannot however be connected with each other to form a composite sheet structure by the usual spot welding or seam welding techniques, owing to the presence of the plastics coating. I have already proposed to enable connection of such sheets, by removing the coating from the sheets at the welding regions so that when the sheets are pressed against each other, an electric contact is established.

With thick plastics coatings and also with thick sheets and other parts, the cavities which are produced by removal of the coating or by embossing or by the insertion of intermediate welding pieces, are bridged over. Consequently, with conventional welding machines, faultless welded connections can be established, even with sheets coated with plastics, lacquers or other materials, or sheets or metal parts made of steel, chrome nickel steel, anodised aluminium or other metals. However, the external coatings of the welded sheets are destroyed at the weld regions, either by having been removed to enable the welding action, or by having melted under the electrodes.

I have already proposed for the welding current to be conducted indirectly through the sheet surface, for at least one of a number of coated sheets to be welded together. As a result of this, the external coating of at least one of the sheets remains undamaged since the welding takes place internally to the opposite bare sheet surface.

When capacitor pulse welding is used, pointed formations should be provided in the cavity, on the sheets or on intermediate welding pieces disposed between the sheets.

It is disadvantageous to weaken the welding regions on the sheet the coating of which is to remain undamaged, and further difficulties are caused by the high local heating which the pointed formations result in at the weld regions.

It is an object of the invention to provide a method for the electric resistance welding of coated sheets enabling at least one of the sheets to remain undamaged at its outer side nevertheless allowing the easy provision of formations facilitating the welding.

It is another object of the invention to provide a method for the electric resistance welding of coated sheets, in which welding current is fed to at least one of the sheets indirectly through the sheet surface and electric contact is established between the sheets by ring-shaped or line-shaped contact edges formed on one of the sheets or on an intermediate piece disposed between the sheets, by embossing or milling.

With suitable formation of the contact edges thick and thin sheets or sheets of different metals can be connected together with resistance welding and with capacitor discharge welding, the heating of the sheets being so slight that the outer coatings remain undamaged. This will be explained in a series of examples.

BRIEF SUMMARY OF THE INVENTION

In a first example, the sheet to be welded onto another sheet is provided with an embossing at its welding region, extending towards the other sheet, by means of a punch and die, and then in the embossed region a cavity with a ring-shaped edge is formed by milling. The coated sheet can then be welded to the counter sheet, which has been removed of its coating at the welding region, so that the outer side of the counter sheet, serving as the decorative side, remains undamaged. For the accurate production of the small ring-shaped edge, the milling tool may be guided in a guide sleeve which is centred by engagement around the outside of the embossed region.

In accordance with a second example, the milling tool may be simply guided in the die so that immediately after the embossing and without having to remount the embossed sheet, a cavity and a sharp ring-shaped edge can be produced.

In a third example, a ring-shaped edge with a surrounding trough-shaped formation can firstly be milled into the sheet at the welding region, and then an embossing effected by means of a punch or by means of the electrode which will subsequently be used for the application of welding current.

According to a fourth example, for seam welding of the sheet, a strip-shaped embossing is performed and then grooves are milled out so as to form line-shaped contact edges. The milling cutters may be of disc-shape guided in the embossing die.

In accordance with a fifth example, for thick sheets the sheet is also milled out above the welding region.

In the sixth and seventh examples, two further forms of the welding regions will be referred to, enabling the outer coatings of the upper and lower sheets to remain undamaged. For achieving these shapes of the welding regions, external and internal milling cutters with suitable shapes are used.

In accordance with an eighth example, with sheets which are too thin to allow milling, ring-shaped or line-shaped contact edges and associated cavities are simply embossed.

In a ninth example, welding strips with ring-shaped edges and cavities are used. They may be firmly retained in a stepped bore or may have a projecting head and be inserted in a continuous bore.

In a tenth example, the contact between the sheets may be further reduced by the use of welding balls. For inserting the welding balls, grooves with triangular cross section are milled out at the welding regions or the sheet to be welded on is provided with bores for receiving the balls.

According to an eleventh example, a welding point is milled on the sheet, and an intermediate welding piece is inserted, the lower side of which has a ring-shaped contact edge and a cavity.

In a twelfth example, between the sheets small hollow intermediate welding pieces are placed, which are provided upwardly with a point and downwardly with a ring-shaped contact edge, or both upwardly and downwardly with ring-shaped contact edges.

According to a thirteenth example, with sheets coated only on one side, and with the interposition of an insulating sheet having perforations, at the welding regions, in each case a ringshaped intermediate welding piece of metal sheet, wire, or in the form of a plate with upwardly and downwardly directed spikes, is inserted.

BRIEF DESCRIPTION OF SEVERAL VIEWS OF THE DRAWING

The above objects of the invention, and the examples discussed, will be clear from the following description which is given by way of example with reference to the accompanying drawings, in which:

FIG. 1, 2 and 3 are sectional views illustrating three stages in the formation of a welding region for sheets coated on both sides, providing a cavity and ring-shaped contact edge in the upper sheet, by embossing and milling;

FIGS. 4 and 5 are sectional views illustrating the production of a welding region with contact edges of rectangular section, and illustrating the welding operation;

FIGS. 6, 7 and 8 are sectional views of a third example, showing the milling of a ring-shaped contact edge, the embossing of the contact region, and the disposition of the two sheets when ready to be welded;

FIG. 9 is a sectional view illustrating the production of a welding region for seam welding, with strip-like embossing and milling of rectilinear cavities and contact edges;

FIGS. 18 and 19 relate to a ninth example, showing milling through of the upper sheet, and the insertion of rivet-like members having cavities and annular contact edges;

FIGS. 20 and 21 relate to a tenth example, showing the interposition of welding balls between the sheets to be welded together;

FIGS. 22 and 23 relate to an eleventh example, showing the provision of a conical welding point in one of the sheets, and an intermediate welding piece having a cavity and a ring-shaped contact edge;

FIGS. 24, 25 and 26 relate to a twelfth example and show three different arrangements using hollow intermediate welding pieces having a pointed formation extending upwardly and a ring-shaped contact edge formation extending downwardly; and FIGS. 27, 28 and 29 illustrate the formation of a welding region for sheet coated on one side only, and showing the use of an insulating sheet between the sheets to be welded, with the provision of intermediate welding pieces having an annular shape.

DETAILED DESCRIPTION OF THE INVENTION

Figure 10:
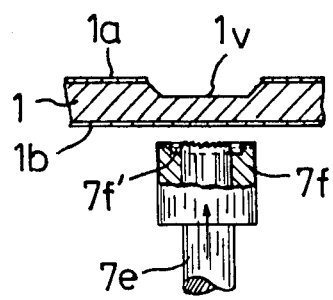
FIGS. 10 and 11 are sectional views relating to a fifth example, in which milling is performed also on the upper side of the sheet, in the case of thick sheets.

In FIGS. 1 to 3, a sheet 1 is illustrated on an enlarged scale, the sheet having a coating 1a on its upper side and a coating 1b on its lower side. At the region where welding is to take place, the coating is removed from the upper side of the sheet at the region 1c, and from the lower side of the sheet at the region 1c, so as to facilitate spot welding. The sheet is placed on a die 4 having a die opening 4a. By means of a punch 3 disposed above the sheet, the sheet is provided with a cylindrical embossed portion 1d and subsequently a cavity 1e is formed on the lower side of the embossed portion by means of a rotating spherical surfaced end milling cutting 7a. As shown in FIG. 2, the milling cutter is guided by a guide sleeve 6 which is accurately centred by engaging over the margin of the embossed region of the sheet. Stop means, not shown, limit the depth of action of the milling cutter, so that a sharp edge 1e'' is formed. By relating the height of the contact edge 1e'' and the depth and angular disposition of the cavity to the welding parameters such as welding time, voltage, current strength, resistance welding and possibly also the establishment of arcs between the bare sheet surfaces to be welded, is enabled.

The prepared sheet 1 is placed above a sheet 2 to be welded on, having the coatings 2a and 2b and a region 2c in the coating 2a, where the coating has been removed, in such a manner that the embossed region of the sheet 1 lies co-axially to the stripped region 2c (see FIG. 3). After connecting the sheet 2 to a welding installation, as diagramatically indicated by an arrow in FIG. 3, the welding is performed by pressing down the electrode 5. The sharp contact edge produces, depending on its angular position, an accurately predeterminable electric resistance, so that if desired, in addition to the resistance welding, electric arcs may occur in the cavity, causing the margin of the cavity to be melted down so that the sheets are welded to each other. The heat produced at the ring-shaped welding region is rapidly conducted into the sheet body and there is only slight heating of the outer side of the sheet. The decorative lowermost coating layer 2b remains undamaged if the electric resistance of the contact edge 1c'' and the welding parameters are suitably selected.

For thick sheets, the arrangement according to the second embodiment shown in FIGS. 4 and 5, is suitable. A sheet 1 having the coatings 1a, 1b has a stripped region 1c' only at the lower side, and is provided with a cylindrically embossed region. For producing a ring-shaped welding region, the embossed region is cylindrically milled out at 1f. For doing this, the shank of an end milling cutter 7b is guided in the opening 4a of the die 4. For supplying a cooling medium, and for enabling removal of the material milled out passages 4b, 4c are provided in the die. The end milling cutter, which is of smaller diameter than its shank cuts a cylindrical recess leaving an edge 1f'' of rectangular cross section. The milling out and the embossing can be performed in a very short time. The amount by which the cutting head of the milling tool 7b is reduced in diameter determines the width of the material constituting the ring and the desired transition resistance is obtained by selecting this width. For arc welding, the width of the ring and the depth of the milled region should be so selected that electric arcs can occur at the bottom of the milled region. The prepared sheet 1 is then placed above a sheet 2 to be welded, and which is coated on both sides and which on its upper side has a region 2c free of coating, and is connected by a cable 9 to a capacitor welding installation C, the lower sheet 2 also being connected to the welding installation by a cable 10. The welding is performed under pressure exerted by a punch 8, which does not carry current. The electric resistance at the edge 1f'' and other factors determine whether only resistance welding or simultaneously an arc welding takes place. The height of the contact edge 1f'' depends on the depth of milling of the embossed region, and can be selectively determined by preferably adjustable abutments which are e.g. arranged on the milling cutter 7b or on the die 4, in order to obtain an optimum electric resistance in combination with the width of the contact edge. The height of the step in the milling cutter may also be chosen so that a precise constant height of the contact edge 1f'' is achieved. Accordingly, it is possible for the electric resistance of the contact edges to be accurately reproducable by means of milling, so that in combination with selection of the welding parameters in accordance with the remaining relations, optimum welding results can be achieved. The outwardly lying coatings remain undamaged if the electric resistance and the welding parameters are suitably selected.

In accordance with the third example, illustrated in FIGS. 6 to 8, the welding region is milled first, so that the embossing is made easier, or so that the embossing can be performed with the aid of the welding electrode. A sheet 1 with the coatings 1a, 1b is provided on its upper side with a region 1c which is free of the coating. Opposite to this, on the lower side, a ring-shaped welding region is formed, having a central cavity 1g, a pointed ring-shaped edge 1c'' and a ring-shaped trough 1g'. For this purpose a double end milling cutter is used, consisting of an inner spherically ended cutter 7c and a ring-shaped end milling cutter 7d fixed thereto, which leaves standing the ring-shaped contact edge 1g'' which has a predetermined electric resistance. The prepared sheet 1 is placed over a sheet 2 to be welded on, the sheet 2 having its upper coating removed at a region 2c, and the sheet 2 is connected to the electric welding circuit. By pressure of an electrode 5, the ring-shaped contact edge is pressed onto the sheet 2 and the welding is thus performed. When the milling is effected in separate working stages, a guide sleeve 6 may be inserted in the outer ring-shaped milling 1g' so as to be precisely centred, and then the central milling 1g is produced, using the guide sleeve. This procedure is not illustrated in the drawings. Alternatively, the pressing forward of the ring-shaped contact edge may take place after the welding current has been switched on so that a delay is introduced which shortens the welding time. As can be seen from FIG. 8, the welding region can alternatively be embossed before the actual welding step. The increasing spacings of the surfaces to be welded, as viewed from the tip of the ring-shaped contact edge towards the cavity, favours the production of electric arcs in the region of the cavity, and limits the heating at this region. The lowermost coating 2b of the sheet 2 remains undamaged.

In accordance with a fourth example, the method may also be applied to seam welding. In FIG. 9 the coating has been removed in a strip-shaped region and the punch 3' and the opening 4a' of the die 4' are strip-shaped. Accordingly, a ridge 1d' is embossed in the sheet 1 having the coatings 1a, 1b. Milling is performed using a disc-shaped milling tool on a horizontal shaft 7p. As will be seen from FIG. 9, the milling tool has a groove milling region 7n at its centre for milling a rectangular channel and at its two sides it has groove milling portions 7q for milling channels with bevelled sides. Thus, when the milling is performed, a central channel 1q' results, with two side channels 1q, which are flanked by contact edges 1q'' and 1q'''. The central groove is deeper so that arcs occur only in the channels 1q, and two welded seams are produced in the sheet, with only slight heating.

Figure 11:
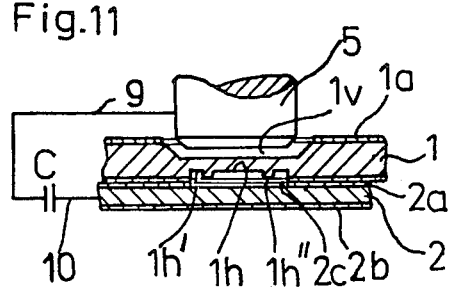

According to a fifth example, illustrated in FIGS. 10 and 11, a thick sheet which can not be embossed is welded onto a thinner sheet. The thick sheet 1 has coatings 1a, 1b and is provided at its upper side with a milled out region 1v and opposite thereto, at its lower side, with a ring-shaped welding region. For forming the ring-shaped welding region, a double end milling cutter is used, consisting of an inner flat ended cutter 7e and an outer annular cutter 7f fixedly connected thereto, the cutter 7f having a recess 7f' at its inner circumference. This recess leaves an edge 1h'' standing in the material of the sheet 1, which is bordered on the inside of a cavity 1h and on the outside by a ring-shaped recess 1h'. The prepared sheet 1 is placed over a sheet 2 having the coatings 2a, 2b with a portion 2c of the upper coating removed, and the sheet 2 is connected to a capacitor welding installation C by a cable 10, and the electrode 5 is connected to the welding installation by a cable 9. By pressing down the electrode the thin region of the sheet 1 between the recess 1v and the cavity 1h is pressed downwardly into contact with the sheet 2, so that welding takes place. The lowermost coating 2b remains undamaged.

The ring-shaped recess 7f' in the milling cutter 7f determines the height and the cross section of the contact edge 1h'' formed by the milling, and thus determines its electric resistance. Instead of using a two-part milling cutter as shown in FIG. 10, a one-piece milling cutter may be used provided it has a recess corresponding to the recess 7f of FIG. 10.

Figure 12:
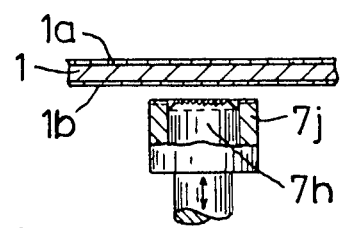
FIGS. 12 and 13 are sectional views relating to a sixth example, showing the milling of an inwardly tapering ring-shaped contact edge.
Figure 13:
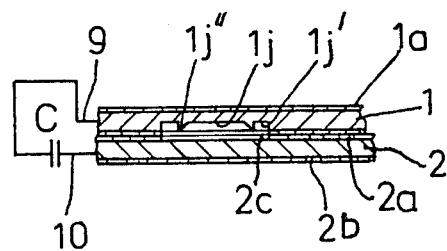

In accordance with a sixth example shown in FIGS. 12 and 13, the formation of electric arcs at the middle of the welding region is promoted. A sheet 1 having the coatings 1a, 1b is provided at its lower side with a ring-shaped welding region. For this, a double end milling cutter is used, consisting of an inner cutter 7h which has a flat end bevelled at its margin, and an outer ring-shaped cutter 7j fixed thereto. The bevelled margin of the inner cutter leaves an inwardly tapering contact edge 1j'' standing, which is inwardly bordered by a ring-shaped milled out region 1j'. The prepared sheet 1 is placed on a sheet 2 having the coatings 2a, 2b and having the coating 2a welding installation C by means of cables 9 and 10. The welding is performed under the pressure of a ram (not illustrated). The inwardly tapering side of the ring-shaped contact edge favours the production of electric arcs in the cavity.

Figure 14:
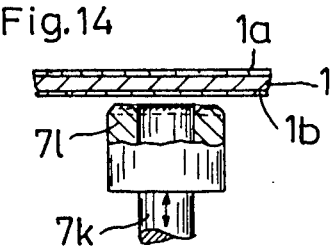
FIGS. 14 and 15 relate to a seventh example, showing the milling of an outwardly tapering ring-shaped contact edge.
Figure 15:
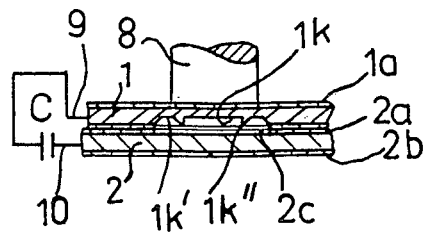

In a seventh example illustrated in FIGS. 14 and 15, the formation of electric arcs at the outside of the cavity is promoted, and the pressing through of the weld region is facilitated. A sheet 1 having coatings 1a, 1b is provided on its lower side with a ring-shaped welding region. For this purpose a double end milling cutter is used, consisting of an inner milling cutter 7k having a flat end, and an outer ring-shaped milling cutter 7l fixedly connected therewith, the cutter 7l being bevelled at its inner and outer end regions. The inner bevel allows an inwardly tapering contact edge 1k'' to remain standing, which is bordered on the inside by a cavity 1k and on the outside by a milled region 1k' having a trapezium-shaped section. The prepared sheet 1 is placed with its weld region centrically over the stripped area 2c of the sheet 2, which has the coatings 2a, 2b. The sheet 1 is connected to a capacitor discharge welding installation C by a cable 9, and the sheet 2 is connected to the welding installation C by a cable 10. The welding is performed under the pressure of the ram 8, which does not conduct current. The lowermost coating 2b of the sheet 2 remains undamaged.

Figure 16:
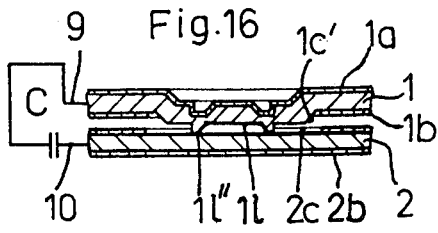
FIGS. 16 and 17 relate to an eighth example, showing two different formations of cavities and contact edges, produced simply by embossing.
Figure 17:
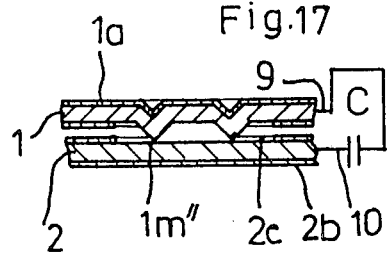

In accordance with an eighth example, more particularly for thin sheets which can not be milled out, embossings as shown in FIGS. 16 and 17 are provided. A sheet 1 coated on both sides has a region 1c at its lower side where the coating has been removed. As shown in FIG. 16, with the aid of a punch and a die, a downwardly directed protrusion is formed, and on the protrusion a pointed inwardly tapering edge 1l'' and a cavity 1l are embossed. In the form shown in FIG. 17, only a downwardly projecting ring-shaped contact edge 1m'' is embossed, the cross section of which has the shape of a triangle. The sheet 2 to be welded on, and which is coated on both sides, has a region 2c on its upper side, from which the coating has been removed. After connecting the sheets 1 and 2 to a welding installation C by cables 9 and 10, the welding is performed under the pressure of a ram (not illustrated). The outer coatings 1a and 2b remain undamaged. For seam welding, the contact edges and cavities are given a rectilinear shape, instead of a circular shape.

In the ninth example, welding studs or rivet-like members are used. In FIG. 18, an upper sheet 1 having coatings 1a and 1b is shown, the sheet having a stepped bore 1r and having a region 1c at its lower side where the coating 1b has been removed. A lower sheet 2, having coatings on both sides but with a region 2c where the coating has been removed from the upper side is positioned underneath the sheet 1. In the bore of the upper sheet, a welding rivet 14 is inserted, the rivet having a widened head, and a cavity 14a at its lower end, serving for forming a ring-shaped contact edge 14b. An electrode 5 which engages the head of the rivet 14 is connected by cable 9 to a capacitor discharge welding installation C and the lower sheet 2 is connected by a cable 10 to the welding installation C. The lower end of the rivet 14 is welded to the sheet 2, under the pressure exerted by the electrode. Since the shank of the welding rivet is not welded to the upper sheet, the upper sheet can be rotated about the shank relative to the lower sheet, after welding. The lower coating of the sheet 2 remains undamaged.

In the modification shown in FIG. 19, the upper sheet 1 is provided with a bore 1t in which a welding rivet 15 is inserted which has a head at its upper end, and at its lower end has a welding stud 15a and a ring-shaped contact edge 15b, these facing a region of a double sided coated lower sheet 22, where the coating has been removed. A sound damping layer 21 is provided on the lower coataing 22b of the sheet 22, and a further sheet 2 having coatings 2a and 2b on its sides is adhesively bonded the layer 21. An electrode 5 is connected to a welding installation C by means of a cable 9, and the sheet 22 is connected to the welding installation by a cable 10. Under the pressure of the electrode, electric arcs are struck, and the welding takes place between the lower end of the welding rivet and the sheet 22. Since the shank of the rivet is not welded to the sheet 1, the sheets can be rotated relative to each other.

In the tenth example, high transition resistances between sheets are obtained by the use of welding balls. In FIG. 20, an upper sheet 1 is shown having coatings 1a and 1b, with the coating 1b removed at a region 1c', and a lower sheet 2 having coatings 2a, 2b with the coating 2a removed at a region 2c. In the stripped regions, ring-shaped grooves 1s of triangular cross section are milled into the sheets. Balls 16 are inserted in the grooves, their diameters being so large that the sheets are held apart at a spacing suitable for enabling the welding to be performed. The welding is then carried out using a ram 8 which does not carry electric current. The small areas of contact established by the balls with the sheets, enable the necessary high electric resistance to be obtained. The outer coatings 1a, 2b remain undamaged.

In FIG. 21, an upper sheet 1 having the coatings 1a and 1b, with the regions 1c, 1c' thereof removed, and with bores 1t provided within the stripped regions is shown, the bores serving for receiving welding balls 17. The welding balls have a diameter which corresponds to approximately twice the sheet thickness and which is slightly smaller than the diameter of the bores. A lower sheet 2 having coatings 2a, 2b has a region 2c on its upper side where the coating has been removed. The lower sheet 2 is connected to an electric welding installation, and an electrode 5 is also connected to the welding installation. The welding is performed under the pressure of the electrode, so that the balls are welded to both sheets. The lower coating remains undamaged.

In an eleventh example, illustrated in FIGS. 22 and 23, an upper sheet 1 having the coatings 1a and 1b is provided at its lower side with a pointed welding region by milling out. For this purpose, an end milling cutter 7m is used, which has a shallow conical recess at its middle. It produces a flat ring-shaped depression 1p' in which there is a shallow conical region with the tip 1p. Coaxial with this milling, the coating is removed from a region 1c' at the lower side of the sheet 1, and opposite thereto on the sheet 2 which has the coatings 2a, 2b, a region 2c is removed from the coating 2a. An intermediate welding piece 11 is inserted between the sheets, its lower side having a cavity and a ring-shaped contact edge 11b. The sheet 1 is connected to a capacitor welding installation C by a cable 9, and the sheet 2 by a cable 10. The welding is performed using the pressure of a ram (not illustrated). By means of the tip 1p on the sheet 1 and of the ring-shaped contact edge 11b of the intermediate welding piece, electric arcs are struck, the surfaces are caused to melt and are welded together under pressure. The lower coatings remain undamaged.

In the twelfth example, the high transistion resistance necessary for short time welding, is achieved by using small insert pieces which are pointed and which have fluted or knurled margins. In FIG. 24, an upper sheet 1 is shown having the coatings 1a and 1b and which at the welding region has its upper coating removed at a region 1c and its lower coating removed at a region 1c'. The lower sheet 2 having the coatings 2a and 2b has a stripped region 2c only at its upper side. Between the bare surfaces, an intermediate welding piece 18 is inserted which is hollow and which is in the form of a pointed cone, so that it contacts the upper sheet only at its apex and contacts the lower sheet with a ring-shaped edge 18b. After connecting the lower sheet to a welding installation, the welding is performed by pressing down the upper sheet with the aid of an electrode (not illustrated).

In the arrangement shown in FIG. 25, an upper sheet 1 having coatings 1a and 1b is provided at its lower side with a region 1c' where the coating is removed, the sheet being arranged over a lower sheet 2 having coatings 2a and 2b, with a region 2c in the upper side thereof where the coating has been removed. An intermediate welding piece in the form of a spherical segment 12 is inserted between the bare regions of the sheets, the segment 12 having at its lower side a ring-shaped edge 12b, and making point contact at its top. The sheets 1 and 2 are connected to a capacitor welding installation C by cables 9 and 10. The welding is performed under the pressure of a ram (not illustrated) and the external coatings remain undamaged.

In the modification shown in FIG. 26, the sheets 1 and 2 are provides with coating removed regions only at the sides thereof which face each other, and an intermediate welding piece 11a is inserted between them, which both at its upper and lower ends has a cavity and a pointed ring-shaped contact edge 11b. The welding is carried out as in the example illustrated in FIG. 25, the construction being suitable for resistnace welding and also for electric arc welding.

In the thirteenth example, illustrated in FIGS. 27 to 29, sheets are welded to each other which are coated only on one side, more particularly aluminium sheets or superimposed sheets which are provided on their opposite sides with a metallic electrically conductive coating. In FIG. 27, a sheet 1 is shown which has a coating 1a only at its upper side, a region 1c having been removed from the coating 1a, and a lower sheet 2 which is provided with a coating 2b only on its lower side. Between the sheets, an insulating insert 19 is placed or bonded which has holes 19a arranged to correspond to the welding regions. In these holes, intermediate welding pieces in the form of sharp edged rings 13 of thin sheet metal are inserted, their height being about double the thickness of the insulating insert. After connecting the lower sheet to a welding installation, the welding is carried out by pressing down an electrode, (not illustrated), onto the sheet 1. The sharp margin of the rings 13 produces the desired high electric resistance. The lowermost coating 2b remainss undamaged.

Instead of using a ring, a plate 13a as shown in FIG. 28 may be used, the plate having spikes at its margin, which are alternately bent upwardly and downwardly. The points of the spikes result in an electric point contact being established.

When the cavity between the sheets 1 and 2 is larger and is to be filled with material, then a ring 13b as shown in FIG. 29 is used, the cross section of which is a rombus or square so disposed that its corners form the upper and lower edges of the ring.

The profiles illustrated in cross section in FIGS. 3, 5, 7, 11, 13, 15 and 23 may be formed in a shape suitable for seam welding, by means of disc milling tools such as shown in FIG. 9, so that the profile cross sections have rectilinear contact edges formed by grooves and ridges, the milling tools being formed by suitable combinations of milling cutters. Instead of guiding the milling cutter by the rectilinear opening of the die 4', other rectilinear guide elements may be used which engage with the groove downwardly embossed in the sheet 1 so as to give an accurate rectilinear guidance to the milling cutter, in relation to the groove. When no embossed regions are present, millings in the lower welding surface of the sheet 1 may serve for arranging the guiding elements for cylindrical or for rectilinear milling.

For limiting the milling depth, the arrangement shown in FIG. 10 provides a ring-shaped recess 7f' by which the height of the ring-shaped contact edge 1h'' (FIG. 11) is determined. The same is true for the milling cutters of FIGS. 6, 12 and 14 and for the milling cutter of FIG. 9.

Instead of determining the milling depth in this manner, abutment elements, more particularly adjustable elements, may be provided on the end milling cutters, which selectively and precisely limit the movement perpendicular to the sheet 1. Corresponding elements may also be arranged on the shaft 7p. This arrangement can also be made use of in respect of the guide elements 6, dies 4, 4' or other parts associated therewith.

I claim:

1. Apparatus for the electrical resistance welding of coated sheet metals to each other, wherein for preserving the outer coating of said sheet metals undamaged the welding current is supplied to at least one of the coated sheets through the metal layer thereof and contact is established between blank areas of the sheet metals to be welded to each other, wherein the improvements comprise means for embossing a portion of at least one of said coated sheet metals in the region thereof to be welded, with the surface of said one coated sheet metal opposed to said embossed surface being unstripped, a die member having an opening the wall of which is positioned around said embossed portion of said sheet metal, a milling cutter guided for axial movement in said opening in said die member and thus centered relative to the surface of said embossed portion, said milling cutter cutting a recess in said embossed surface, with the dimension of said milling cutter relative to the dimension of said embossed surface being such that there remains an edge surrounding said recess to facilitate the welding operation when a lower coated sheet metal member, stripped in the welding area, is positioned below said embossed sheet metal member, said die member being formed with supply and drainage channels which intersect said opening for directing coolant to the surface being milled and subsequently to be welded, and removing chips formed during such milling operation, and means for supplying welding current to said sheet metals, such current passing from said one sheet metal to the other sheet metal through said edge of said embossed surface.

2. The apparatus of claim 1 wherein said embossing means and said milling cutter are vertically aligned above and underneath the sheet metals to be welded to each other, whereby the embossing and milling of the welding areas can be effected in uniform arrangement and in immediate succession.

3. The apparatus of claim 1 wherein said milling cutter includes a shank portion of reduced diameter relative to the opening in said die, said shank portion cutting a cylindrical recess in said embossed region of said one of said coated sheet metals.

4. The apparatus of claim 1 wherein said welding current is supplied by a capacitor welding installation having cable electrically connected to each of said coated sheet metals, and means for applying pressure to said coated metal sheets during the welding operation.

* * * * *